Patented Oct. 19, 1948

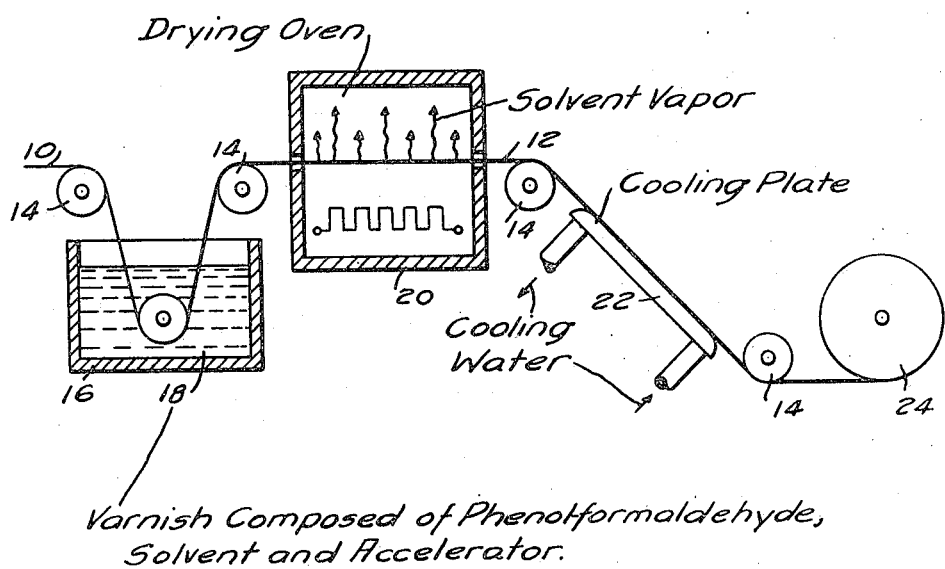

2,452,005

UNITED STATES PATENT OFFICE 2,452,005

METHOD OF COATING WITH SYNTHETIC RESIN CONTAINING AN ACCELERATOR, AND RESIN COMPOSITION

William C. Weltman, Wilkinsburg, Pa., and Thomas F. Dixon, Pasadena, Calif., assignors to Westinghouse Electric Corporation, East Pittsburgh, Pa., a corporation of Pennsylvania Application April 10, 1945, Serial No. 587,508

6 Claims. (Cl. 117—161)

This invention relates to improvements in synthetic resins, more particularly to improved resin varnish compositions which are characterized by more rapid reaction during the process of preparing products therefrom.

This application is a continuation in part of our copending application Serial No. 439,352 filed April 17, 1942, entitled "Synthetic resins," and now abandoned.

An extensively applied method of combining fibrous materials and synthetic resins in the preparation of members therefrom consists of the following steps. A phenolic substance, such for example, as cresylic acid is reacted with a methylene containing material such, for example, as a 40% formaldehyde solution in water in the presence of a suitable catalyst, usually an alkaline material of organic or inorganic nature. The reaction takes place at temperatures and for a period of time sufficient to cause the formation of a phenol-formaldehyde product in the A-stage which is readily soluble in a volatile organic solvent. Water is produced in the process and it is removed by evacuation. When organic amines such as ethylenediamine are employed as catalysts in the reaction of the phenol and formaldehyde, they can only be employed in small amounts of the order of 0.1% to 0.2% of the weight of the reactants because of their powerful catalyzing action. The evacuation of water at the termination of the initial reaction steam distills off any undecomposed organic amine. Analysis of the A-stage product will show only traces of the amine therein.

The A-stage phenol-formaldehyde reaction product is a thick viscous liquid which is unsuitable for most impregnating purposes. To produce a low viscosity impregnating material, a solvent selected from such organic liquids as toluol, xylol, ethyl alcohol, or mixtures thereof, is added to the resinous reaction product, and a solution is produced which is usually designated as a resin varnish. Usually from 30% to 60% of the varnish, by weight, is composed of phenol-formaldehyde.

When the phenol-formaldehyde varnish is applied to a fibrous material such as paper, cloth or the like, it is heated to evaporate the solvent and to cause a further polymerization or gelation of the phenol-formaldehyde to a hardened condition short of the final infusible stage. A definite time is required to reach this condition, commonly designated as the B-stage.

The reaction product of phenol and formaldehyde produced by the initial reaction in the reaction vessel in the presence of a catalyst is of no definite chemical structure, but it is believed that the phenolic and methylene groups are associated in varying degrees of simple molecular combination. It is known that some of the phenolic and methylene groups have combined to form relatively simple molecules of low molecular weight. These molecules have a relatively low boiling point and will evaporate under the temperatures necessary to cause gelation. They are, therefore, lost during the impregnating and heat treating process. In some cases a substantial proportion of the A-stage resin may consist of volatile phenol-formaldehyde molecules which escape from the fibrous material during the heat-treating process.

The process of heat-treating the resin applied to the fibrous material for a given time causes a polymerization or condensation of the simple phenol-formaldehyde molecular groups into larger molecular groups. The B-stage product is hard whereas the material produced in the initial reaction was a thick viscous syrup. This process of conversion of the phenolic resin from the thick liquid in the A-stage to the hard resin condensate in the B-stage will be referred to herein as gelation.

The object of this invention is to provide for accelerating the gelation time of resin varnishes.

A further object of the invention is to provide for expediting the drying process as applied to fibrous material impregnated with thermosetting resin varnishes.

Other objects of the invention will, in part, be obvious, and will, in part, appear hereinafter. For a fuller understanding of the nature and objects of the invention, reference should be had to the single figure of the drawing showing a schematic view of apparatus for the preparation of impregnated fibrous base material.

It has been found that the time and temperatures required for the gelation of the phenolic resin varnish applied to the fibrous material is a definite characteristic of the particular resinous A-stage phenol-formaldehyde. The proportions of phenol to aldehyde, the nature of the catalyst and conditions of reaction are factors determinative of optimum gelation time. From an economical viewpoint the heat treating temperature of a given phenolic varnish should be such that a minimum of the lighter molecular weight phenol-formaldehyde is evaporated during the process. However this may prove uneconomical because of the undue time required. Operating at higher temperatures may decrease the gelation time somewhat, but the phenolic resin may not be uniformly gelled and the loss of resin increases disproportionately due to the evaporation of the simple molecules. Furthermore for any given phenol-formaldehyde resin varnish, a given temperature and rate of passage of cloth or other fibrous sheet material carrying the resin through a drying oven produces a predetermined greenness and volatile content. For example, for a given heat-treating oven a cresylic acid-formaldehyde resin varnish prepared under predetermined conditions and applied to 6-ounce duck in an amount equal to the weight of the fabric was heat-treated to produce a low volatile, low greenness resin at a speed of 85 inches per minute. Increase of the velocity of travel of the impregnated sheet beyond this value along with suitable temperature changes resulted in a much greener resin and greater volatile content as well as poor gelation. The impregnated duck product produced was not as acceptable for molding purposes as that produced at the lower oven speed.

In order to better understand the invention reference should be made to the single figure of the drawing which is a schematic diagram, partly in section, of an apparatus in which sheet material is impregnated with a phenolic varnish and heat-treated. Fibrous material 10, for example, cloth, in long lengths, is guided over a number of rolls 14 throughout the entire processing apparatus. The cloth 10 is initially guided into the receptacle 16 containing a quantity of the phenol-formaldehyde resin varnish 18 at a suitable viscosity and consistency to enable application of a good coating. The cloth acquires a predetermined amount of varnish in passing through the receptacle 16, depending on the number of immersions it undergoes and the pressure which is applied at rolls 14. The varnish impregnated cloth 12 is guided through an oven 20 which is maintained at a high temperature. The temperature of the oven is sufficiently high so that the solvent is evaporated and further condensation and reaction of the resin occurs so that at the exit from the oven the cloth carries phenol-formaldehyde resin in the B-stage. In order to prevent the hot resin from further reacting and thus approaching too closely to or reaching the infusible or C-stage, it is often cooled by passing the resin impregnated cloth over a plate 22 through which cooling water is circulated. The B-state phenolic resin impregnated cloth is wound into a roll 24 and may be stored or subjected to further processing in molding the product to predetermined shape.

It has been discovered that the process shown in the single figure of the drawing may be greatly expedited by shortening the gelation time of the resin by adding thereto an accelerating catalyst. We have found that this added accelerating catalyst functions in a different manner than the catalyst employed in the reaction vessel to initially react the phenolic and formaldehyde materials. The reaction from the A-stage to the B-stage is a different type of polymerization. Generally the initial catalyst, if solid, is not present since the varnish is strained and filtered of all the initial reaction catalyst when the varnish is being prepared prior to putting it into the impregnating tank 16. Any residual vaporizable amines or ammonia or the like will have been withdrawn during the evacuation of the A-stage resin to remove water of condensation.

Furthermore, the accelerating catalyst employed in our process performs an entirely different function than the initial catalyst. Many materials which are satisfactory as catalysts in the reaction vessel have been tested and had no beneficial effect in regard to gelation time when added to the varnish. For example, hexamethylene tetramine, a tertiary amine, is not appreciably effective for the purpose of the invention, even though it is effective in the initial reaction.

According to our invention, the gelation accelerating materials are selected from primary organic amines in which the nitrogen is attached to a methylene group ($CH_2=$) and the organic amines have a boiling point above about 50° C. Lower boiling organic amines evaporate so rapidly when applied in varnish films that they are relatively ineffective. We have found that primary diamines in which each nitrogen is attached to a methylene group are particularly effective. Examples of suitable primary diamines are ethylenediamine, 1,2-propylenediamine, 1,3-propylenediamine, diethylenetriamine and hexamethylenediamine. When applied to a given phenol-formaldehyde resin having a gelation time of 15.7 minutes, they reduced the time to about 11.9 minutes with 1% of the diamine. Triethylenetetramine and tetraethylenepentamine are other amines suitable for the practice of the invention.

Other primary amines found to be effective as accelerators were ethanolamine, mono n-butylamine, mono n-propylamine, benzylamine and monoamylamine.

Secondary and tertiary amines have been found to be of slight benefit in expediting the gelation of phenol-formaldehyde A-stage resin. We have found from a great number of secondary and tertiary amines that, with the exception of diethylamine, none decreased the gelation time by 10% when employed in concentrations of 1%, and therefore they were not particularly advantageous. Primary amines directly attached to the ring structure in aryl groups were of no significant benefit or were even retardants. For example B-naphthylamine increased the gelation time. Diethylamine has been found to be as effective as accelerator as mono n-butylamine.

In general the presence of more than five aliphatic carbon atoms per primary amino group has been found to decrease the effectiveness of the accelerator for the purpose of this invention.

The quantity of the primary amine organic compound to be added to the resin varnish may vary from effective amounts of the order of 0.1% up to 2% and more by weight of the resin varnish. As an example of the effect of varying the proportions of the accelerator a varnish was produced by reacting 1 mol of cresylic acid with 1 mol of formaldehyde in the presence of ammonium hydroxide catalyst, the resin being refluxed after reaching a temperature of about 95° C. The resin was evacuated after a sufficient time of reaction to remove substantially all of the water present and a 50% resin varnish was produced by adding an ethyl alcohol solvent. The gelation time of the varnish without any accelerator when applied to cloth under standard conditions was 19.2 minutes. Incorporating 0.5% of ethylenediamine in the varnish, the gelation time under the same conditions was 15.2%; with 1% ethylenediamine, the gelation time was 12.5 minutes.

A varnish composed of the following, all parts by weight,

| | |
|---|---|
| m-p Cresol | 4000 |
| Aqueous formaldehyde (37½%) | 4000 |
| Tung oil | 1600 |
| Aqueous ammonia (28%) | 60 |
| Ethylenediamine | 9 | was prepared by reacting the components for one hour at from 75° C. to 95° C., then refluxed for 1¼ hours at 94° C. to 100° C. and dehydrated at 15 to 26 inches of mercury at a temperature not in excess of 100° C. When dissolved into a mixture of equal parts of alcohol and benzol to produce a varnish, the varnish had a gelation time of 17.2 minutes. With ½% ethylenediamine, it had a gelation time of 14.8 minutes, and with 1% ethylenediamine the gelation time was reduced to 13.6 minutes.

Any phenol-formaldehyde varnish with the primary amine accelerator added thereto can be put into the receptacle 16 shown in the drawing and applied to sheet material with the advantageous results described herein.

Furthermore, it has been discovered that with the application of the accelerating catalyst to the resin varnish the speed of impregnated cloth travel through the drying oven may be considerably higher, the oven temperature being higher as well, without untoward results in the molded product. The example given hereinbefore of a speed through the oven of 85 inches per minute as the optimum speed of a phenolic resin without an accelerating catalyst applied to 6-ounce duck was changed to a speed of 165 inches per minute with the addition of 0.35% ethylenediamine. The final product was as satisfactory as that produced at the slower speed.

In addition, it has been found that the accelerating catalyst results in the recovery of more of the resin present in the varnish. As stated previously, the light molecules of phenol-formaldehyde tend to escape during the drying process and a substantial amount of resin is lost in the heating process. When a varnish was prepared by dissolving a given weight of resin in the reaction vessel in a given weight of solvent, the cloth retained 49.8% of the weight of the varnish, that is, 50.2% of weight of the varnish consisting of solvent and volatile phenol-formaldehyde was lost during heating of the cloth impregnated with varnish. The same varnish was prepared with the addition of 0.5% ethylene diamine. The cloth was found to retain 51.7% of the weight of the varnish. With 1% ethylenediamine added to the same varnish, 52% of the weight of the varnish was retained as resin in the B-stage on the cloth coming out of the oven. Stating this in another way, the addition of 1% ethylenediamine resulted in 4.3% more resin being recovered as B-stage resin on the cloth from the given varnish solution.

The introduction of accelerating catalyst of the type disclosed herein therefore decreases the gelation time of the resin varnish whereby the B-stage is reached more rapidly. Secondly, fibrous material impregnated with the catalyst containing resin varnish may be treated at a greatly accelerated rate in the drying ovens with a satisfactory final product which compares favorably with prior material on all points, and finally, the introduction of the accelerating catalysts results in a greater recoverable resin content in the varnish, since some of the phenol-formaldehyde which tends to escape during the drying process is retained due to the presence of the accelerator.

These increases in treating time and the more efficient recovery of phenol-formaldehyde from resin solutions constitute exceedingly important advances in the art of treating materials with phenol-formaldehyde. The advantages of speeding up the treating process to the extent indicated is desirable since a given apparatus may treat more sheet material without any substantial changes in the equipment.

In practicing this invention the accelerator may be added to the reaction product of any phenol, such as cresylic acid, cresol or phenol, and a methylene containing compound, such as, for example, as formaldehyde, polymers of formaldehyde such as paraformaldehyde, or the like, initially reacted with any catalyst such as organic catalysts comprising amines or ammonia, or inorganic alkaline catalysts selected from calcium hydroxide and sodium hydroxide, as examples. Likewise, tung oil or oiticica oil may be initially reacted with the phenol and aldehyde and the oil modified phenolics treated with the primary amine accelerators.

Since certain changes may be made in the above invention, and different embodiments of the invention could be made without departing from the scope thereof, it is intended that all matter contained in the above description or taken in connection with the accompanying drawing shall be interpreted as illustrative and not in a limiting sense.

We claim as our invention:

1. A resin composition, comprising in combination, an A-stage partially reacted solvent soluble phenol-aldehyde thermosetting resin derived by reacting a phenol from the group consisting of phenol, cresols, and cresylic acid with an aldehyde from the group consisting of formaldehyde and its polymers, from 0.1% to 2% of the weight of the resin of an accelerator to expedite gelation of the resin when subjected to heating to a condition short of the final infusible state, the accelerator having been added after the resin has been partially reacted to the A-stage, the accelerator being selected from the group composed of primary saturated aliphatic amines having no other reactive groups than the amine groups, having nitrogen attached to a methylene group and having less than 5 carbon atoms per amino group, the primary organic amines having a boiling point above 50° C., and a solvent for the resin and accelerator.

2. A resin composition, comprising in combination, an A-stage partially reacted solvent soluble oil modified phenol-aldehye thermosetting resin derived by reacting a phenol from the group consisting of phenol, cresols and cresylic acid with an aldehyde from the group consisting of formaldehyde and its polymers and with an oil from the group consisting of tung oil and oiticica oil, from 0.1% to 2% of the weight of the resin of an accelerator to expedite gelation of the resin when subjected to heating to a condition short of the final infusible state, the accelerator having been added after the resin has been partially reacted to the A-stage, the accelerator composed of a primary saturated aliphatic organic amine having no other reactive group than the amine groups, having nitrogen attached to a methylene group, and having less than 5 carbon atoms per amino group, the organic amine having a boiling point above 50° C., and a solvent for the resin and accelerator.

3. A resin composition, comprising in combination, an A-stage partially reacted solvent soluble phenol-aldehyde thermosetting resin derived by reacting a phenol from the group consisting of phenol, cresols, and cresylic acid with an aldehyde from the group consisting of formaldehyde and its polymers, from 0.1% to 2% of the weight of the resin of an accelerator to expedite gelation of the resin when subjected to heating to a condition short of the final infusible state, the accelerator having been added after the resin has been partially reacted to the A-stage, the accelerator composed of a primary saturated aliphatic organic diamine having no other reactive groups than the amine groups, having each nitrogen attached to a methylene group and having less than 5 carbon atoms per amino group, the organic diamine having a boiling point above 50° C., and a solvent for the resin and accelerator.

4. A resin composition, comprising in combination, an A-stage partially reacted solvent soluble phenol-aldehyde thermosetting resin derived by reacting a phenol from the group consisting of phenol, cresols, and cresylic acid with an aldehyde from the group consisting of formaldehyde and its polymers, from 0.1% to 2% of the weight of the resin of an accelerator to expedite gelation of the resin when subjected to heating to a condition short of the final infusible state, the accelerator having been added after the resin has been partially reacted to the A-stage, the accelerator composed of ethylenediamine, and a solvent for the resin and accelerator.

5. In a process for applying a partially reacted A-stage thermosetting phenolic resin derived by reacting a phenol from the group consisting of phenol, cresols, and cresylic acid with an aldehyde from the group consisting of formaldehyde and its polymers in solution in a volatile solvent to fibrous material, the steps comprising incorporating in the solution of the A-stage phenolic resin from 0.1% to 2% of the weight of the resin of a primary saturated aliphatic organic amine having nitrogen attached to a methylene group, the organic amine having no other reactive group than the amine group, the organic amine having a boiling point above 50° C. and not more than five aliphatic carbon atoms per primary amino group, applying the solution of phenolic resin to the fibrous material and subjecting the treated fibrous material to heat in order to remove the solvent and to further polymerize the phenolic resin to a condition short of the final infusible state, the organic amine providing for a more rapid reaction as compared to the reaction without the organic amine.

6. In a process for applying a partially reacted thermosetting A-stage phenolic resin derived by reacting a phenol from the group consisting of phenol, cresols, and cresylic acid with an aldehyde from the group consisting of formaldehyde and its polymers in solution in a volatile solvent to fibrous material the steps comprising, incorporating in the solution of the A-stage phenolic resin from 0.1% to 2% of the weight of the resin of a primary saturated aliphatic organic diamine having each nitrogen attached to a methylene group, the organic amine having no other reactive group than the amine group, the organic diamine having a boiling point above 50° C. and not more than five aliphatic carbon atoms per primary amino group, applying the solution of phenolic resin to the fibrous material and subjecting the treated fibrous material to heat in order to remove the solvent and to further polymerize the phenolic resin to a condition short of the final infusible state, the organic diamine providing for a more rapid reaction as compared to the reaction without the organic diamine.

WILLIAM C. WELTMAN.
THOMAS F. DIXON.

REFERENCES CITED

The following references are of record in the file of this patent:

UNITED STATES PATENTS

| Number | Name | Date |
|---|---|---|
| 1,098,608 | Aylsworth | June 2, 1914 |
| 1,323,284 | Jackson | Dec. 2, 1919 |
| 1,734,516 | Foulds | Nov. 5, 1929 |
| 1,860,441 | Voss | May 31, 1932 |
| 2,088,227 | Battye | July 27, 1937 |
| 2,151,975 | Kline | Mar. 28, 1939 |
| 2,267,390 | Alexander | Dec. 23, 1941 |